May 9, 1950

M. E. BAILEY 2,507,085

TABULATING CARD

Filed Feb. 9, 1946

INVENTOR.

MILES E BAILEY

BY

ATTORNEY

Patented May 9, 1950

2,507,085

UNITED STATES PATENT OFFICE 2,507,085

TABULATING CARD

Miles E. Bailey, Tonawanda, N. Y., assignor to Remington Rand Inc., Buffalo, N. Y., a corporation of Delaware Application February 9, 1946, Serial No. 646,583

5 Claims. (Cl. 281—25)

This invention relates to statistical record cards, and more particularly to the assembling into pads of such cards.

In certain fields of business it is often desirable to have statistical record cards padded for distribution. The cards may be receipts or, as illustrated, postal money orders which carry serial numbers. These serial numbers appear on the card in the form of perforations which control accounting machines such as the sorter disclosed in the patent to W. W. Lasker 1,476,161, issued June 16, 1936. These serial numbers are pre-punched in the card before padding. If, as shown in the patent to C. Ehret, 2,079,437, issued May 4, 1937, the card carries a stub, a special machine having the necessary card feed and punch chamber to accommodate the enlarged card must be provided for pre-punching. This necessarily increases the cost of preparing the cards. Also, the serrations and irregularities on a card torn from such a stub, or from a pad formed by gluing the edges of the cards to a backing, form a roughened edge which often causes mis-feeds and card jams in a machine such as the sorter above. Furthermore, once a card is torn from either of the above types of pad it cannot be replaced, as is sometimes desired when it has been removed in error. There are also instances when it is desirable to attach a card, such as the one in question, to a letter or other papers. If this is done by stapling and the card torn off, the staple remains in the card which again causes trouble in record controlled machines.

It is, therefore, the principal object of this invention to provide a card and a method of padding a number of such statistical record cards in such manner that they may be pre-punched in the normal perforating devices.

Another object is to provide a padded statistical card which will not be damaged when removed from the pad, thereby affecting its efficiency in the machines with which it is used.

A further object is to provide a card and a method of padding a number of such statistical record cards which will permit the replacement thereof either after use or if removed in error.

Another object of the invention is to provide a method of padding record cards in which neither the dimensions nor characteristics of the card will be altered.

A more clear conception of the invention and other objects may be had from the following specification when read in conjunction with the accompanying drawings, in which Fig. 1 is an isometric showing of a plurality of cards padded in accordance with the invention;

Figure 1:
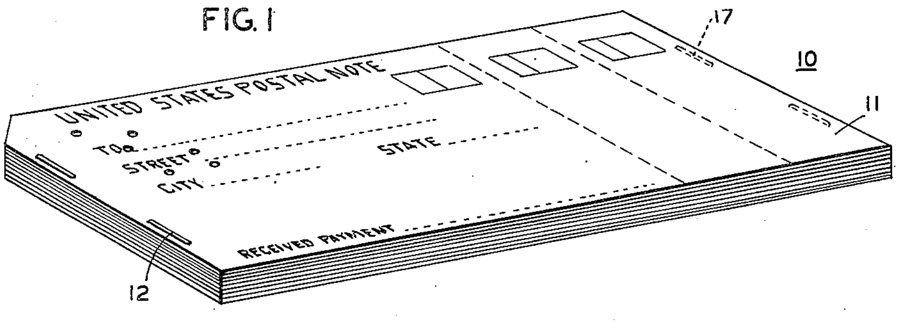
Figures 2, 3, 4, 5, 6:
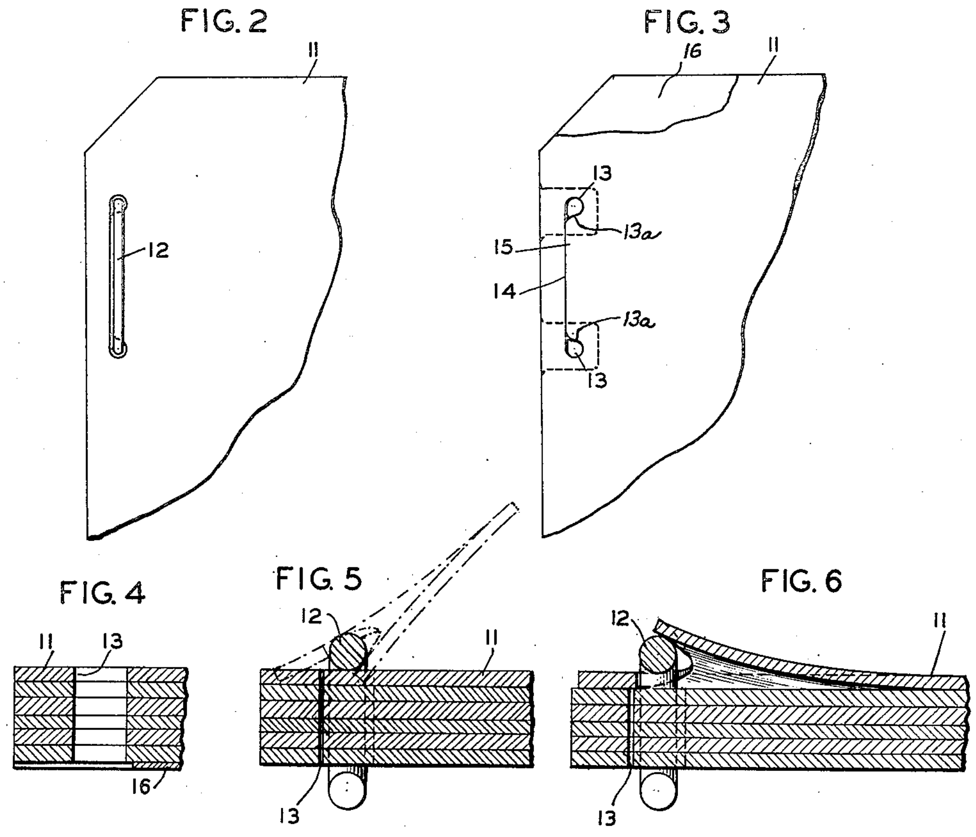
Fig. 2 is an enlarged detail showing of the staple in a card.
Fig. 3 is an enlarged detail showing of the perforations for the staple and the tongue formed by slitting between the perforations.
Fig. 4 is a cross section showing the cards stacked for stapling.
Fig. 5 is a cross sectional view showing the action of the tongue while removing a card.
Fig. 6 is a cross sectional view showing a card in position to be replaced and the action of the tongue.
Figure 7:
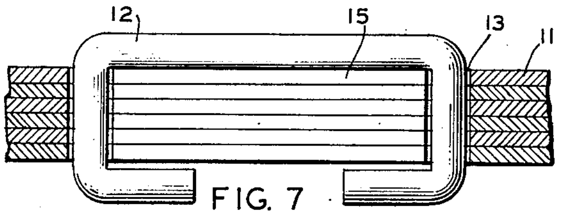
Fig. 7 is a cross section showing a staple in place.

The preferred form of the invention as shown in Fig. 1 comprises a pad 10 the cards 11 of which are held together by one or more staples 12. The cards are each prepared as shown in Fig. 3 with perforations 13 spaced apart the distance between the legs of a staple and joined by a slit 14 forming a tongue or tab 15. The edges of the perforations, in the quadrant portions thereof that define the shape of the free end of the tab, are inversely arced as at 13*a* so that the tab is not only provided with rounded corners but cannot be imprisoned by the legs of the staple. The slit is tangent to one side of the perforations and cooperates with said inversely arced portions of the perforations to provide an elongation in the perforation that facilitates removal and replacement of the card with respect to the staple without mutilation. Square perforations can also be employed which provide parallel side edges on the tab. The slit need not necessarily be tangent to the perforations, but in the form shown a tab of maximum area is provided with a slit that permits detachment of the card from the staple with a simple lifting motion. This operation is performed on any suitable type of card perforator and slitter. The cards are then stacked with a thin metal plate 16 preferably of less thickness than a card. The legs of the staple 12 are then inserted through the perforations so that the body of the staple overlies the tab 15 and are then bent over using the plate 16 as an anvil, thereby preventing the cramping or squeezing of the cards by the staple and damage to the lowermost card in the stack. The plate 16 is then removed leaving the cards free on the staple, which prevents their being damaged while being removed. Any well known means may be used for inserting the staples.

To remove a card from the stack the free end is raised as shown in Fig. 5. This slides the tongue 15 out from under the staple, thus freeing the card from the pad. If a card is withdrawn in error it may be replaced by positioning the card in alignment with the others in the pad as shown in Fig. 6. A flat instrument, such as a letter opener or finger nail is then all that is needed to depress the tongue 15 into position under the staple 12, or the tab may be depressed and slid under the staple until the end of the card overrides the staple and snaps into place.

If it is desired to re-pad the cards after use, for instance, for storage purposes, it is only necessary to stack the cards in alignment and insert an open staple in the perforations and bend the ends over with any suitable means. Should it be desired to attach a card to a letter or other paper, the perforations are aligned with the staples in an ordinary office stapler and the staple applied. The card can then be removed from the letter in the same manner as above, i. e., by raising the free end and withdrawing the tongue 15 from under the staple without damaging the letter or card.

It is obvious that cards padded in this manner are easily and efficiently assembled without increasing the size of the card. Also, due to the fact that the card need not be altered in any dimension from that used in the card operated machines, it may be pre-punched in the normal perforating machines such as that disclosed in the patent to W. W. Lasker, 2,044,707, issued June 16, 1936.

It is also apparent that the cards may be stapled at each end as indicated by dotted lines 17 in Fig. 1. In this case the removal of a card is effected by grasping the card in the middle and raising it until the tongues 15 thereof are slid out from under the staples.

It is also apparent that the use of this method of stapling cards or even papers into a pad is not limited to statistical cards alone. It may well be used for other purposes than padding, such as fastening checks to vouchers and the like, in fact anywhere the attached paper is to be removed without damage.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. The method of binding cards and the like, comprising punching spaced perforations in each of a plurality of cards, slitting said cards between said perforations to form a flap for free passage between the legs of a staple in said perforations, stacking said cards together with a thin metal plate, inserting a staple into said perforations in such manner that said staple straddles said flap and said plate, gripping said flap and plate by bending over the free ends of said staple about said flap and plate, and loosening the grip on said flap by removing said metal plate.

2. The method of binding cards and the like, comprising punching spaced perforations in cards near one edge thereof, slitting said cards between said perforations to form a flap for free passage between the legs of a staple in said perforations, stacking said cards together with a thin metal plate, inserting a staple in said perforations in such a manner as to straddle said flap, said plate being cut away at a point in alignment with said perforations to permit removal thereof after said staple has been inserted, bending the free ends of said staple toward one another about said flap and removing said plate thereby binding said cards into a pad.

3. A card or the like adapted for staple binding, having adjacent an edge thereof spaced perforations for receiving the legs of a staple, and a slit connecting said perforations and cooperating therewith to define a tongue between the perforations for binding engagement by the staple and said tongue being shaped for passage without distortion between the legs of the staple.

4. In a card or the like for detachable and attachable relation with a binding staple, spaced perforations in the card for receiving the legs of the staple, a slit joining said perforations and through which a portion of the staple between the legs may pass, the slit and the perforations cooperating to define a tongue disposed between said perforations and underlying said portion of the staple and said tongue being shaped for passage without distortion between the legs of the staple when said portion of the staple is passed through said slit.

5. A pad comprising a plurality of cards or the like each cut to provide a plurality of perforations and a slit connecting the perforations to define a tab, a staple passing through the perforations of each card and about said tabs for retaining the cards in assembled pad forming relation, and said tab being shaped for passage without distortion through the staple when a card is detached from or attached to the pad.

MILES E. BAILEY.

No references cited.